United States Patent
Puthoor et al.

(10) Patent No.: US 11,934,698 B2
(45) Date of Patent: Mar. 19, 2024

(54) PROCESS ISOLATION FOR A PROCESSOR-IN-MEMORY ("PIM") DEVICE

(71) Applicant: ADVANCED MICRO DEVICES, INC., Santa Clara, CA (US)

(72) Inventors: Sooraj Puthoor, Austin, TX (US); Muhammad Amber Hassaan, San Marcos, TX (US); Ashwin Aji, Santa Clara, CA (US); Michael L. Chu, Santa Clara, CA (US); Nuwan Jayasena, Santa Clara, CA (US)

(73) Assignee: ADVANCED MICRO DEVICES, INC., Santa Clara, CA (US)

( * ) Notice: Subject to any disclaimer, the term of this patent is extended or adjusted under 35 U.S.C. 154(b) by 0 days.

(21) Appl. No.: 17/556,503

(22) Filed: Dec. 20, 2021

(65) Prior Publication Data
US 2023/0195375 A1    Jun. 22, 2023

(51) Int. Cl.
G06F 3/06 (2006.01)
G06F 7/575 (2006.01)

(52) U.S. Cl.
CPC .......... *G06F 3/0659* (2013.01); *G06F 3/0622* (2013.01); *G06F 3/0631* (2013.01); *G06F 3/0656* (2013.01); *G06F 3/0679* (2013.01); *G06F 7/575* (2013.01)

(58) Field of Classification Search
CPC .... G06F 3/0659; G06F 3/0622; G06F 3/0631; G06F 3/0656

USPC ......................................................... 711/154
See application file for complete search history.

(56) References Cited

U.S. PATENT DOCUMENTS

| | | | |
|---|---|---|---|
| 6,233,668 B1 | 5/2001 | Harvey et al. | |
| 6,725,456 B1 | 4/2004 | Bruno et al. | |
| 6,851,059 B1 | 2/2005 | Pfister et al. | |
| 8,738,860 B1 | 5/2014 | Griffin et al. | |
| 2010/0023941 A1 | 1/2010 | Iwamatsu et al. | |
| 2014/0237261 A1 | 8/2014 | Diep et al. | |
| 2017/0048358 A1* | 2/2017 | Roberts | G06F 13/00 |
| 2018/0089081 A1* | 3/2018 | Ramalingam | G11C 16/10 |
| 2019/0018777 A1 | 1/2019 | Swaine | |
| 2019/0066761 A1 | 2/2019 | Lea et al. | |
| 2019/0079677 A1* | 3/2019 | Malladi | G06F 13/1689 |
| 2023/0195459 A1 | 6/2023 | Puthoor et al. | |
| 2023/0195645 A1 | 6/2023 | Puthoor et al. | |

OTHER PUBLICATIONS

Kim et al, "Silent-PIM: Realizing the Processing-in-Memory Computing With Standard Memory Requests", IEEE Transactions on Parallel and Distributed Systems, vol. 33, No. 2, Published Mar. 11, 2021. (Year: 2021).*

(Continued)

*Primary Examiner* — Than Nguyen

(57) ABSTRACT

Process isolation for a PIM device through exclusive locking includes receiving, from a process, a call requesting ownership of a PIM device. The request includes one or more PIM configuration parameters. The exclusive locking technique also includes granting the process ownership of the PIM device responsive to determining that ownership is available. The PIM device is configured according to the PIM configuration parameters.

20 Claims, 7 Drawing Sheets

(56) References Cited

OTHER PUBLICATIONS

Gao, et al., "Practical Near-Data Processing for In-memory Analytics Frameworks," 2015 International Conference on Parallel Architecture and Compilation (PACT), Oct. 2015, IEEE, San Francisco, CA, 12 pages.

Hajj et al., "SpaceJMP: Programming with Multiple Virtual Address Spaces," ACM SIGPLAN Notices, vol. 51, Issue 4, Apr. 2016, https://doi.org/10.1145/2954679.2872366, 16 pages.

Hall et al., "Memory Management in PIM-Based Architecture," In: Chong et al., "Intelligent Memory Systems," IMS 2000, Lecture Notes in Computer Science, vol. 2107, Springer, Berlin, Heidelberg, https://doi.org/10.1007/3-540-44570-6_7, Published Sep. 5, 2001, 23 pages.

Hori, et al., "Process-in-Process: Techniques for Practical Address-Space Sharing," Proceedings of the 27th International Symposium on High-Performance Parallel and Distributed Computing, Jun. 11-15, 2018, Tempe, AZ, USA, https://doi.org/10.1145/3208040.3208045, Published: Jun. 11, 2018, 13 pages.

* cited by examiner

PROCESS ISOLATION FOR A PROCESSOR-IN-MEMORY ("PIM") DEVICE

BACKGROUND

Computing systems often include a number of processing resources, such as processors or processor cores, which can retrieve instructions, execute instructions, and store the results of executed instructions to memory. A processing resource can include a number of functional units such as arithmetic logic units (ALUs), floating point units (FPUs), and combinatorial logic blocks, among others. Typically, such functional units are local to the processing resources. That is, functional units tend to be implemented as part of a processor and are separate from memory devices in which data to be operated upon is retrieved and data forming the results of operations is stored. Such data can be accessed via a bus between the processing resources and memory.

Processing performance can be improved by offloading operations that would normally be executed in the functional units to a processing-in-memory (PIM) device. PIM refers to an integration of compute and memory for execution of instructions that would otherwise be executed by a computer system's primary processor or processor cores. In some implementations, PIM devices incorporate both memory and functional units in a single component or chip. Although PIM is often implemented as processing that is incorporated 'in' memory, this specification does not limit PIM so. Instead, PIM may also include so-called processing-near-memory implementations and other accelerator architectures. That is, the term 'PIM' as used in this specification refers to any integration—whether in a single chip or separate chips—of compute and memory for execution of instructions that would otherwise be executed by a computer system's primary processor or processor core. In this way, instructions executed in a PIM architecture are executed 'closer' to the memory accessed in executing the instruction. A PIM device can therefore save time by reducing or eliminating external communications and can also conserve power that would otherwise be necessary to process memory communications between the processor and the memory.

DETAILED DESCRIPTION

Figure 1:
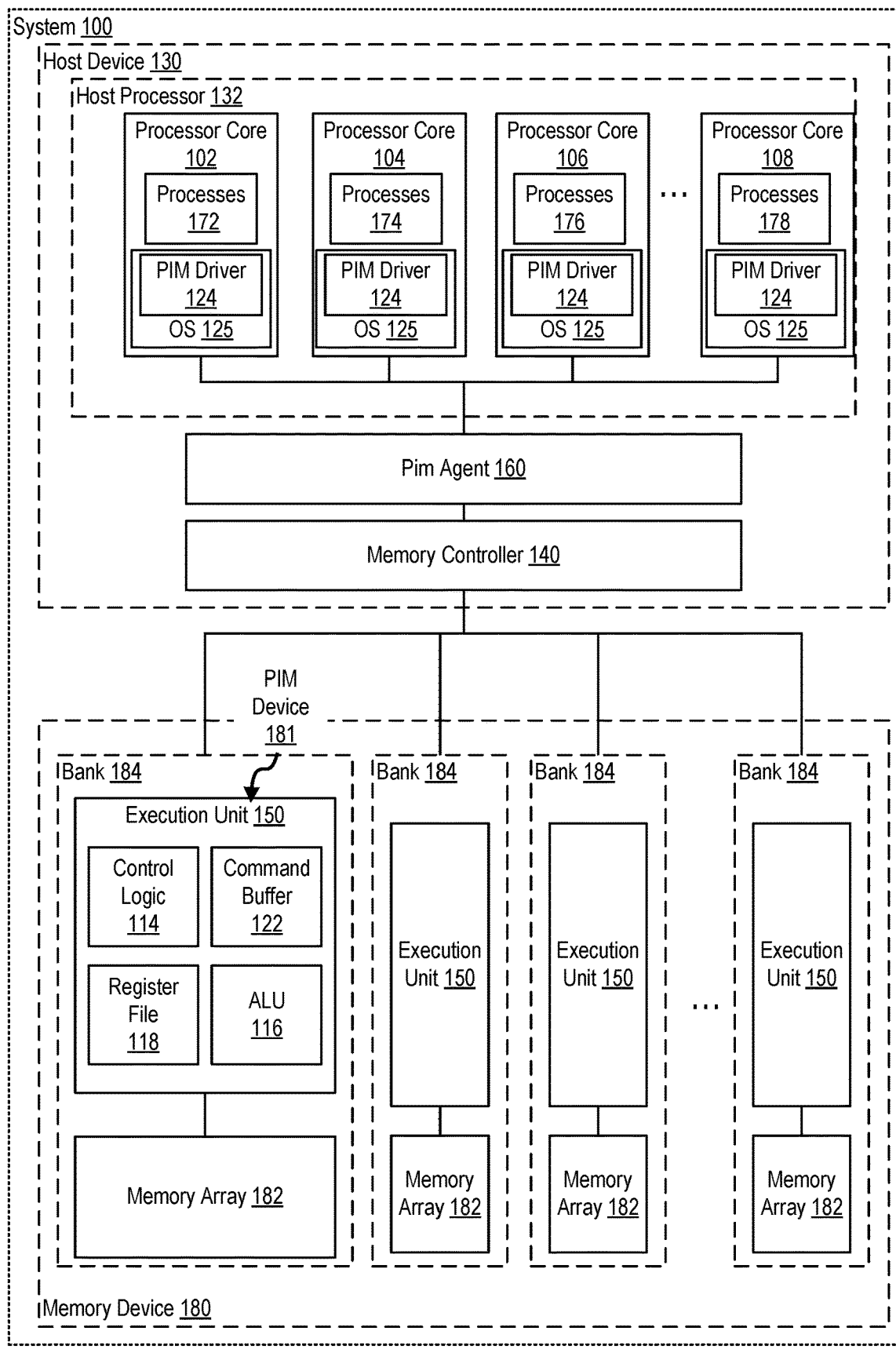
FIG. 1 sets forth a block diagram of an example system for process isolation for a PIM device in accordance with the present disclosure.

As mentioned above, PIM architectures support operations to be performed in, at, or near to the memory module storing the data on which the operations are performed on or with. Such an architectures allows for improved computational efficiency through reduced data transfer as well as reduced power consumption. In some implementations, a PIM architecture supports offloading instructions from a host processor for execution in memory or near memory, such that bandwidth on the data link between the processor and the memory is conserved and power consumption of the processor is reduced. The execution of PIM instructions by a PIM device does not require loading data into local CPU registers and writing data from local CPU storage back to the memory.

Such host processor often support multi-processing where multiple processes of the same or different applications are executed in parallel. In such a multi-processing environment, however, without protection, two or more processes can simultaneously access a shared PIM resource in a manner that results in functional incorrectness or security vulnerability. Concurrent access can result in functional incorrectness when, for example, two processes access the same PIM register. For example, assume process "A" loaded instructions into a PIM's local instruction store. During process A's PIM execution, suppose another process such as, for example, process "B" modifies this local instruction store. Process A's PIM code is then corrupted, and process A's PIM execution will return incorrect results. Similarly, process B can also access PIM registers by sending PIM memory operations and can corrupt the PIM register state as well, resulting in incorrect PIM phase execution of process A.

Additionally, such simultaneous access can also result in security vulnerabilities. For example, one process can create a side channel via PIM registers to another process's data without knowledge of that process. For example, if process B is malicious, process B can create a side channel via PIM registers by sending PIM memory operations that can leak PIM register information of process A into its own address space.

Accordingly, implementations in accordance with the present disclosure provide hardware support and resource management techniques for providing exclusive access on a PIM device to a process (e.g., exclusive PIM device access is granted to a process) by assigning ownership of the PIM device thus avoiding process interference at the PIM device. Implementations in accordance with the present disclosure also prevent corruption of PIM configuration space (including LIS that stores MI's instructions, PIM configuration registers, and the like) by isolation or virtualization. All PIM orchestration operations are isolated by allowing and restricting only one process to orchestrate PIM from a PIM control engine (e.g., a PIM orchestration engine). It should also be noted that PIM memory/units has two distinct spaces; 1) a PIM configuration space used for configuring the PIM before the PIM operation, and 2) a PIM orchestration space, which is needed for orchestrating PIM. Once a PIM process is permitted, it is critical to know and understand the type of PIM process that is to be performed. Thus, an LIS component is used to track each type of PIM operation and the operations of the PIM process. That is, the LIS component indicates the instructions for the PIM process (e.g., the LIS component tells the PIM process what to do such as, for example, instructions to be executed as part of the PIM process).

In one aspect, a PIM device can also be a PIM unit and "device" or "unit" can be used interchangeably. In one aspect, as used herein "orchestrate" refers to the planning, coordinating, configuring, and managing of each operation related to a PIM. While examples in this disclosure discuss the applicability of the implementations to PIM technology, such examples should not be construed as limiting.

To that end, various apparatus and methods are disclosed in this specification for process isolation for a PIM device through exclusive locking. An implementation is directed to an apparatus configured for such process isolation. The apparatus includes one or more processing cores executing a plurality of a processes. The processing cores also execute computer program instructions that carry out receiving, from one of the processes, a call requesting ownership of a PIM device, where the request includes one or more PIM configuration parameters. The processing cores also execute instructions that carry out granting the process ownership of the PIM device responsive to determining that ownership is available and configuring the PIM device according to the PIM configuration parameters.

In an implementation of the apparatus, the processing cores execute computer program instructions that carry out receiving, from the process, a call to relinquish ownership and making the PIM device available for ownership.

In an implementation of the apparatus, the processing cores execute computer program instructions that carry out denying access to the process responsive to determining that ownership is not available. In another implementation the processing cores also execute computer program instructions that carry out: making the PIM device available for ownership responsive to a request to relinquish ownership; again receiving, from the process, a call requesting ownership of the PIM device, the request including the PIM configuration parameters; and granting the process ownership of the PIM device.

In another implementation, the processing cores execute computer program instructions that carry out: receiving, from the process, a request to allocate a PIM aperture for use in issuing PIM instructions to the PIM device; and allocating the PIM aperture only if the process has been granted ownership of the PIM device. In another implementation, the processing cores execute computer program instructions that carry out: providing to a dispatcher of a PIM control engine, identification of the process having ownership of the PIM device, where the dispatcher is configured to dispatch PIM instructions to the PIM device only if the PIM instructions are from the process having ownership of the PIM device.

A method of process isolation for a PIM device is also disclosed in this specification. In an implementation, the method includes receiving, from a process, a call requesting ownership of a PIM device, the request including one or more PIM configuration parameters; and granting the process ownership of the PIM device responsive to determining that ownership is available, including configuring the PIM device according to the PIM configuration parameters. In an implementation, the method also includes receiving, from the process, a call to relinquish ownership and making the PIM device available for ownership. The method is carried out by one of: a driver, a hypervisor, an operating system, and a PIM agent.

In an implementation, the method also includes denying access to the process responsive to determining that ownership is not available. In another implementation, the method includes making the PIM device available for ownership responsive to a request to relinquish ownership; again receiving, from the process, a call requesting ownership of the PIM device, the request including the PIM configuration parameters; and granting the process ownership of the PIM device.

In an implementation, the method also receiving, from the process, a request to allocate a PIM aperture for use in issuing PIM instructions to the PIM device; and allocating the PIM aperture only if the process has been granted ownership of the PIM device. In another implementation, the method includes providing to a dispatcher of a PIM control engine, identification of the process having ownership of the PIM device, wherein the dispatcher is configured to dispatch PIM instructions to the PIM device only if the PIM instructions are from the process having ownership of the PIM device.

Also disclosed in this specification is an apparatus configured for process isolation for a PIM, where one or more processing cores executing a plurality of a processes, and at least one of the processes is configured to carry out: making a call requesting ownership of a PIM device, the request including one or more PIM configuration parameters; and receiving a return indicating the PIM device has been configured according to the PIM configuration parameters and that ownership is granted to the process. In an implementation, the call requesting ownership of the PIM device includes a PID (Process Identifier) of the process requesting ownership.

In an implementation, the process is further configured to carry out: executing a kernel of PIM instructions on the PIM device; and upon completion of the kernel, making a call to relinquish ownership of the PIM device.

In another implementation, a second process is configured to carry out: making a call requesting ownership of the PIM device, the request including one or more PIM configuration parameters; and receiving a return indicating that that the call failed. In another implementation, the first process is further configured to carry out making a call to relinquish ownership of the PIM device; and the second process is further configured to carry out: retrying, a predetermined period of time after receiving the return indicating that the call failed, the call requesting ownership of the PIM device; and receiving a return indicating the PIM device has been configured and that ownership is granted to the second process.

In an implementation, the process is further configured to carry out: making a call requesting an allocation of a PIM aperture for use in issuing PIM instructions to the PIM device; and receiving a return indicating the allocation succeeded only if the process has been granted ownership of the PIM device; and issuing PIM instructions using the aperture, wherein the PIM instructions are dispatched for execution only if the process has ownership of the PIM device. In another implementation, the process is further configured to carry out: issuing PIM instructions according to an extended ISA (Instruction Set Architecture), where the PIM instructions are dispatched for execution only if the process has ownership of the PIM device.

Implementations in accordance with the present disclosure will be described in further detail beginning with FIG.

1. Like reference numerals refer to like elements throughout the specification and drawings. FIG. 1 sets forth a block diagram of an example system 100 for process isolation for a PIM device in accordance with the present disclosure.

The example system 100 of FIG. 1 includes a host device 130 including a processor 132 that includes one or more processor cores 102, 104, 106, 108. While four processor cores are depicted in FIG. 1, it should be understood that the host device 130 can include more or fewer processor cores than depicted. In various examples, the processor cores 102, 104, 106, 108 are CPU cores, GPU cores, or APU cores of the host device 130. In various examples, the processor cores 102, 104, 106, 108 operate as PIM control engines.

The GPU is a graphics and video rendering device for computers, workstations, game consoles, and similar digital processing devices. A GPU is generally implemented as a co-processor component to the CPU of a computer. The GPU can be discrete or integrated. For example, the GPU can be provided in the form of an add-in card (e.g., video card), stand-alone co-processor, or as functionality that is integrated directly into the motherboard of the computer or into other devices.

The phrase accelerated processing unit ("APU") is considered to be a broad expression. The term 'APU' refers to any cooperating collection of hardware and/or software that performs those functions and computations associated with accelerating graphics processing tasks, data parallel tasks, nested data parallel tasks in an accelerated manner compared to conventional CPUs, conventional GPUs, software and/or combinations thereof. For example, an APU is a processing unit (e.g., processing chip/device) that can function both as a central processing unit ("CPU") and a graphics processing unit ("GPU"). An APU can be a chip that includes additional processing capabilities used to accelerate one or more types of computations outside of a general-purpose CPU. In one implementation, an APU can include a general-purpose CPU integrated on a same die with a GPU, a FPGA, machine learning processors, digital signal processors (DSPs), and audio/sound processors, or other processing unit, thus improving data transfer rates between these units while reducing power consumption. In some implementations, an APU can include video processing and other application-specific accelerators.

It should be noted that the terms processing in memory (PIM), processing near-memory (PNM), or processing in or near-memory (PINM), all refer a device (or unit) which includes a non-transitory computer readable memory device, such as dynamic random access memory (DRAM), and one or more processing elements. The memory and processing elements can be located on the same chip, within the same package, or can otherwise be tightly coupled. For example, a PNM device could include a stacked memory having several memory layers stacked on a base die, where the base die includes a processing device that provides near-memory processing capabilities.

The host device 130 of FIG. 1 is configured to host multi-process execution. For example, each processor core 102, 104, 106, 108 of the host device 130 executes a different process 172, 174, 176, 178 of the same or different application.

In an implementation, the processor cores 102, 104, 106, 108 operate according to an extended instruction set architecture (ISA) that includes explicit support for PIM instructions that are offloaded to a PIM device for execution. Examples of PIM instruction include a PIM Load and PIM Store instruction among others. In another implementation, the processor cores operate according to an ISA that does not expressly include support for PIM instruction. In such an implementation, a PIM driver, hypervisor, or operating system provides an ability for a process to allocate a virtual memory address range that is utilized exclusively for PIM instructions. An instruction referencing a location within the aperture will be identified as a PIM instruction.

In the implementation in which the processor cores operate according to an extended ISA that explicitly supports PIM instructions, a PIM instruction is completed by the processor cores 102, 104, 106, 108 when virtual and physical memory addresses associated with the PIM instruction are generated, operand values in processor registers become available, and memory consistency checks have completed. The operation (e.g., load, store, add, multiply) indicated in the PIM instruction is not executed on the processor core and is instead offloaded for execution on the PIM device. Once the PIM instruction is complete in the processor core, the processor core issues the PIM instruction along with a command, operand values, memory addresses, and other metadata to the PIM device. In this way, the workload on the processor cores 102, 104, 106, 108 is alleviated by offloading an operation for execution on a device external to or remote from the processor cores 102, 104, 106, 108.

The offloaded PIM instructions are executed by at least one PIM device 181. In the example of FIG. 1, the PIM device 181 is an execution unit 150 that is external to the processor 132 and processor cores 102, 104, 106, 108. In one example, the execution unit includes control logic 114 for decoding instructions or commands issued from the processor cores 102, 104, 106, 108, an arithmetic logic unit (ALU) 116 that performs an operation indicated in the PIM instructions or command, and a register file 118 including a plurality of indexed registers for holding data for load/store operations to memory or intermediate values of ALU computations. In some examples, the ALU 116 is capable performing a limited set of operations relative to the ALUs of the processor cores 102, 104, 106, 108, thus making the ALU 116 less complex to implement and, for example, more suited for an in-memory implementation.

A PIM instruction can move data between the registers and memory, and it can also trigger computation on this data in the ALU 116. In some examples, the execution unit also includes a command buffer 122 that stores commands of PIM instructions written into the command buffer by the host processor 132. In these examples, the PIM instructions include a pointer to an index in the command buffer 122 that includes the operations to be executed in response to receiving the PIM instruction. For example, the command buffer 122 holds the actual opcodes and operands of each PIM instruction.

The execution unit 150 is a PIM device 181 that is included in a PIM-enabled memory device 180 (e.g., a remote memory device) having one or more DRAM arrays. In such an implementation, PIM instructions direct the PIM device 181 to execute an operation on data stored in the PIM-enabled memory device 180. For example, operators of PIM instructions include load, store, and arithmetic operators, and operands of PIM instructions can include architected PIM registers, memory addresses, and values from core registers or other core-computed values. The ISA can define the set of architected PIM registers (e.g., eight indexed registers).

In some examples, there is one execution unit per DRAM component (e.g., bank, channel, chip, rank, module, die, etc.), thus the PIM-enabled memory device 180 include multiple execution units 150 that are PIM devices. PIM commands issued from the processor cores 102, 104, 106, 108 can access data from DRAM by opening/closing rows and reading/writing columns (like conventional DRAM commands do). In some implementations, the host processor 132 issues PIM commands to the ALU 116 of each execution unit 150. In implementations with a command buffer 122, the host processor 132 issues commands that include an index into a line of the command buffer holding the operation to be executed by the ALU 116. In these implementations with a command buffer 122, the host-memory interface does not require modification with additional command pins to cover all the possible opcodes needed for PIM operations. Each PIM command carries a target address that is used to direct it to the appropriate PIM unit(s) as well as the operation to be performed. An execution unit 150 can operate on a distinct subset of the physical address space. When a PIM operation reaches the execution unit 150, it is serialized with other PIM operations and memory accesses to DRAM targeting the same subset of the physical address space.

The execution unit 150 is characterized by faster access to data relative to the host processor 132. The execution unit 150 operates at the direction of the processor cores 102, 104, 106, 108 to execute memory intensive tasks. In the example of FIG. 1, the execution unit 150 is implemented within a memory partition and is coupled to a memory array 182. The memory array 182 can be one or more arrays of memory cells of a bank, channel, or other memory hierarchy partition. Without loss of generality, when discussing execution units 150 as PIM devices, it is assumed that each execution unit is coupled to a respective memory bank 184 that includes the memory array 182. Readers of skill in the art will appreciate that various configurations of PIM devices and memory partitions (physical or logical) in a PIM-enabled memory device can be employed without departing from the spirit of the present disclosure. The PIM-enabled memory devices can be memory devices such a double data rate (DDRx) memory device, graphics DDRx (GDDRx) memory device, low power DDRx (LPDDRx) memory device, high bandwidth memory (HBM) device, hybrid memory cube (HMC) device, Non-Volatile Random-Access Memory (NV-RAM) device, or other memory device that supports PIM.

The host device 130 also includes at least one memory controller 140 that is shared by the processor cores 102, 104, 106, 108 for accessing a channel of the PIM-enabled memory device 180. In some implementations, the host device 130 can include multiple memory controllers, each corresponding to a different memory channel in the PIM-enabled memory device 180. In some examples, the memory controller 140 is also used by the processor cores 102, 104, 106, 108 for executing one or more processes 172, 174, 176, and 178 and offloading PIM instructions for execution by the execution unit 150.

The memory controller 140 maintains one or more dispatch queues for queuing commands to be dispatched to a memory channel or other memory partition. Stored in memory and executed by the processor cores 102, 104, 106, 108 is an operating system 125 and a PIM driver 124.

The PIM driver 124 aids in process isolation for the PIM device 181 by exclusively locking access of a configuration space of the PIM device to a single process and exclusively locking orchestration of the PIM device to the same process. In the example of FIG. 1, the PIM driver 124 can work with the PIM agent 160 to provide such process isolation. In other implementations, the PIM driver 124 can operate without a PIM agent at all.

The PIM driver 124 prevents corruption of PIM configuration space. The PIM configuration space including a Local Instruction Store ("LIS") that stores PIM's instructions, PIM configuration registers, and the like. The PIM driver 124 receives, from one of the processes (process 172, for example), a call requesting ownership of the PIM device 181. The request includes one or more PIM configuration parameters. PIM configuration parameters are values that are to be utilized to program configuration space of a PIM device.

The PIM driver then determines whether ownership of the PIM device is available. If ownership is available, the PIM driver 124 grants the process 172 ownership of the PIM device 181 and configures the PIM device 181 according to the configuration parameters provided by the process 172. The PIM driver 124, in an implementation, programs the configuration space of the PIM device through use of a PIM agent. In other implementations, the PIM driver 124 programs the configuration space without use of an intermediary PIM agent.

The PIM driver determines whether ownership of the PIM device is available based on previous requests for ownership from other processes. If another process previously requested ownership, was granted ownership, and has not relinquished ownership of the PIM device, the PIM driver denies the requesting process 172 ownership. In such an implementation, the requesting process 172 will retry the request at a later time.

The PIM driver maintains a record of an 'active' or 'owner' process. Such a record can include the owner process's PID (process identifier). When a process makes a call to the driver 124 to request ownership of the PIM device and configure the PIM device's configuration space, the call includes the PID of the requesting process. The driver 124, when granting ownership of the PIM device to a process, stores that process's PID in a record. The driver 124 clears a PID from the record when the owner process makes a call to relinquish the ownership of the PIM device. In this way, the PIM driver 124, upon receiving a call requesting ownership of the PIM device inspects the record to determine if there is currently an owner of the PIM device. If there is not, then the PIM driver 124 grants the request and stores the PID of the requesting PIM device in the record. If there is, the PIM driver 124 denies the request. In some implementations, the PIM driver 124 also provides the active owner's PID to a PIM agent or to the PIM device. The agent and device can use that PIM owner's PID to determine whether a process can access the PIM device's resources (described below in greater detail).

The PIM configuration space, through which configuration registers and LIS can be accessed, are memory mapped to the driver's address space (e.g., similar to a GPU control registers). By mapping the PIM configuration space into a driver address space, programming the LIS and writing the configuration registers of the PIM device 181 can only be performed by the driver.

The PIM driver 124 also provides PIM orchestration isolation by allowing only one process (the current active owner of the PIM device) of the processes 172, 174, 176, and 178 to orchestrate PIM from the execution unit 150. The term 'orchestrate' as used here refers to the programming of a PIM device with operations to carry out rather than with configuration. In implementations in which the processing cores operate according to an extended ISA that explicitly supports PIM instructions, a process engages in PIM orchestration by issuing PIM-specific instructions supported by the ISA itself. In such an implementation, the driver 124 provides to a dispatcher of a PIM control engine, the identification of the process having ownership of the PIM device. The dispatch logic inspects a kernel object before every dispatch to determine if it is a PIM orchestration kernel. In one aspect, a "PIM orchestration kernel" is a kernel that includes PIM-specific instructions. This information can also be embedded in the kernel object header along with the other kernel dispatch meta information. After inspection, if the kernel is determined to be a PIM orchestration kernel, the dispatcher dispatches the PIM instructions only if the kernel belongs to the PIM-owner. In this way, the dispatcher isolates all processes other than the current owner from orchestration of the PIM device.

In implementations in which the processing cores do not operate according to an extended ISA that explicitly supports PIM instructions, a process will call the driver 124 requesting an allocation of a PIM aperture. A PIM aperture is a virtual address range utilized by a process solely to issue PIM instructions. Any instruction targeting an address in the PIM aperture is identified as a PIM instruction. To ensure that PIM ownership is isolated to a single process, the PIM driver, upon receiving such a request, allocates the PIM aperture only if the process requesting the allocation has been granted ownership of the PIM device.

In some variations, this locking of the PIM device to a single process at a time can be implemented in one or more resources of the system 100 other than the PIM driver 124. For example, the OS itself, a hypervisor, or a PIM agent operating in user address space can perform the isolation. Whatever device or module administers the ownership control of the PIM device, the lock can be relinquished at process termination or when the PIM-device owner process requests to relinquish the lock. It is noted that the operations of acquiring a lock by switching from user to driver/kernel mode is a one-time overhead.

In some implementations, the PIM control engine can be the processor cores 102, 104, 106, 108 (e.g., a GPU). In some variations, the PIM control engine can be a dedicated processing element such as, for example, a microcontroller (e.g., memory controller 140) or a low-power processor core that orchestrates the PIM. The PIM control engine can be single threaded PIM control engine or multi-threaded PIM control engine. The PIM control engine can be informed about the PIM-owner by a driver (by writing into its PIM owner ID register) and the PIM control engine launches work to the execution unit 150 only if the requesting process is the PIM owner.

As mentioned above, in some implementations, a PIM agent 160 is responsible for PIM configuration and/or orchestration of the execution unit 150. The PIM agent 160 can be the processor cores 102, 104, 106, 108. In some implementations the PIM agent 160 can be a dedicated processing element such as a platform security processor or direct memory access ("DMA") microcontroller, or any other system agent of the system 100. By way of illustration only, FIG. 1 depicts the PIM agent 160 as a stand-alone, dedicated processing element in communication with the processor cores 102, 104, 106, 108 and the memory controllers 140.

In some implementations, the PIM agent 160 manages PIM resources at the host level before reaching any DRAM channels of the PIM-enabled memory device 180 that host a PIM unit to which a process can dispatch work. That is, the PIM agent 160 determines whether or not a process has been assigned as a PIM owner of the execution unit 150. The PIM agent 160 accepts the access request of the process for accessing PIM resources and the execution unit 150 if the application is assigned as a PIM owner. Alternatively, the PIM agent 160 rejects the access request of the application for accessing PIM resources and the execution unit 150 if the application is assigned as a PIM owner.

In some implementations, the memory mapped PIM configuration space and virtual-to-physical page map can be used. The PIM configuration and orchestration address space of the execution unit 150 is mapped only to the PIM agent 160. The PIM agent 160 can execute in the driver's 124 address space. For example, the processor cores can issue the processes 172, 174, 176, and 178 to configure and orchestrate PIM on the execution unit 150. For example, an application can issue an API call or system call (e.g., an input/output control ("IOCTL") call via the processor cores 102, 104, 106, 108 (or drivers) for configuring and orchestrating the PIM. The driver launches the PIM configuration and orchestration work to the PIM agent 160. The PIM agent 160 then configures and orchestrates PIM on the execution unit 150. Another process is serviced only after the current PIM work is completed on the execution unit 150.

In some implementations, code on the PIM agent 160 runs in the user address space so that the PIM agent 160 can execute in the driver's address space. The user application will make an API call provided by PIM runtime or PIM library for configuring and orchestrating PIM. The PIM agent 160 is informed about the PIM-owner by the processor cores 102, 104, 106, 108 (e.g., or driver associated with the processor cores 102, 104, 106, 108). The user application can make a call to the processor cores 102, 104, 106, 108 (e.g., or driver associated with the processor cores 102, 104, 106, 108) for making it the PIM-owner and all other processes of the operation proceeds as discussed herein.

In some implementations, an additional authorized "PIM" user can be created and executed on the PIM agent 160. The additional authorized PIM user can be an application that is assigned PIM ownership with limited privileges or restricted access to access PIM configuration and orchestration space for orchestrating PIM. For example, the limited privileges can indicate that only an application instruction for executing a single load/store operation can be authorized for accessing the PIM resources. All other processes of the operation proceeds as discussed herein except that the limited privileges define what operations can be allowed to access PIM resources and the execution unit 150.

To provide additional support to allow temporal PIM isolation, the PIM agent 160 can reserve registers from the register file 118 of the execution unit 150 for the authorized PIM-owner application that is actively dispatching processes to the execution unit 150 for orchestration and configuration. In some implementations the PIM agent 160 reserves space in a command buffer 122 to the authorized PIM-owner process of the processor of the processor cores 102, 104, 106, 108 that is dispatching processes to the execution unit 150 for orchestration and configuration. The PIM agent 160 intercepts PIM commands flowing from the processor cores 102, 104, 106, 108 to the memory controller 140, where they are dispatched to the execution unit 150. When an authorized process (e.g., PIM-owner) of a processor core executes one or more instructions that offload one or more operations to the execution unit 150, the PIM agent 160 generates one or commands for directing the execution unit 150 to execute the offloaded operations.

Figure 2:
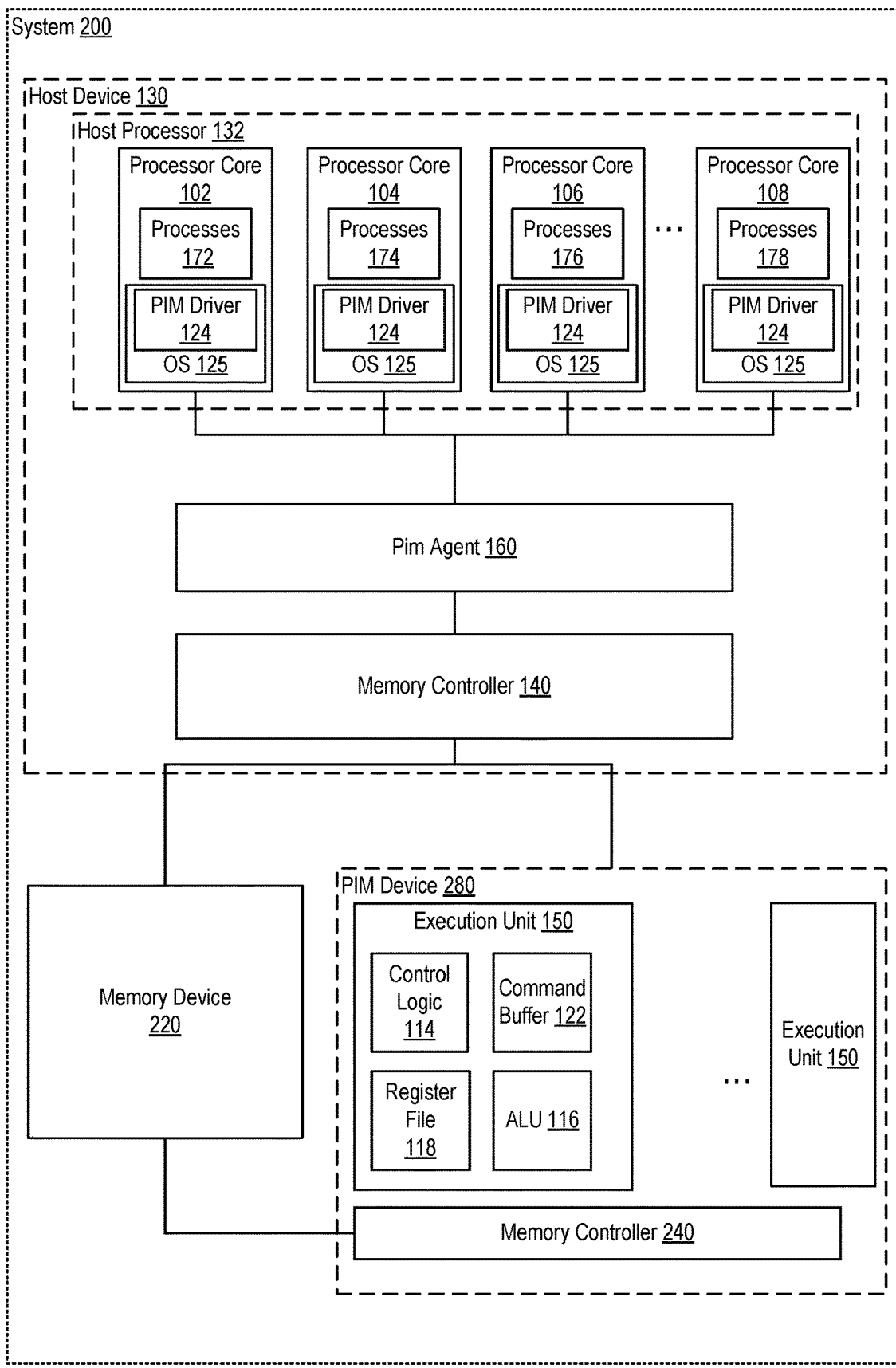
FIG. 2 sets forth a block diagram of an example system for supporting multiprocessing with PIM in accordance with the present disclosure.

For further explanation, FIG. 2 sets forth a block diagram of an example system 200 for supporting multiprocessing with PIM in accordance with the present disclosure. The example system 200 of FIG. 2 includes many of the same components of system 100 of FIG. 1.

In the example of FIG. 2, the execution unit 150 is a component of a PIM device 280 that is implemented in a processing-near-memory (PNM) fashion. For example, the PIM device 280 can be a memory accelerator that is used to execute memory-intensive operations that have been offloaded to by the host processor 132 to the accelerator. The host processor 132 and the PIM device 280 are both coupled to the same memory 220. The host processor 132 provides PIM instructions to the PIM device 280 through the memory controller 140, which the execution unit 150 of the PIM device 280 performs on data stored in the memory 220. Thus, the PIM device 280 is "near" memory in that the execution unit 150 is interposed between the memory controller 140 of the host processor 132 and the memory 220. In some examples, the PIM device 280 is coupled to the memory 220 via a memory controller 240, where the memory 220 is not specifically a PIM-enabled memory. In the example of FIG. 2, the execution unit 150 is not implemented within a particular DRAM component (e.g., bank, channel, chip, rank, module, die, etc.) but is closely coupled to the memory 220. For example, the PIM device 280 can be implemented in the interface die of a 3-D stacked memory device or as a separate die.

Figure 3A:
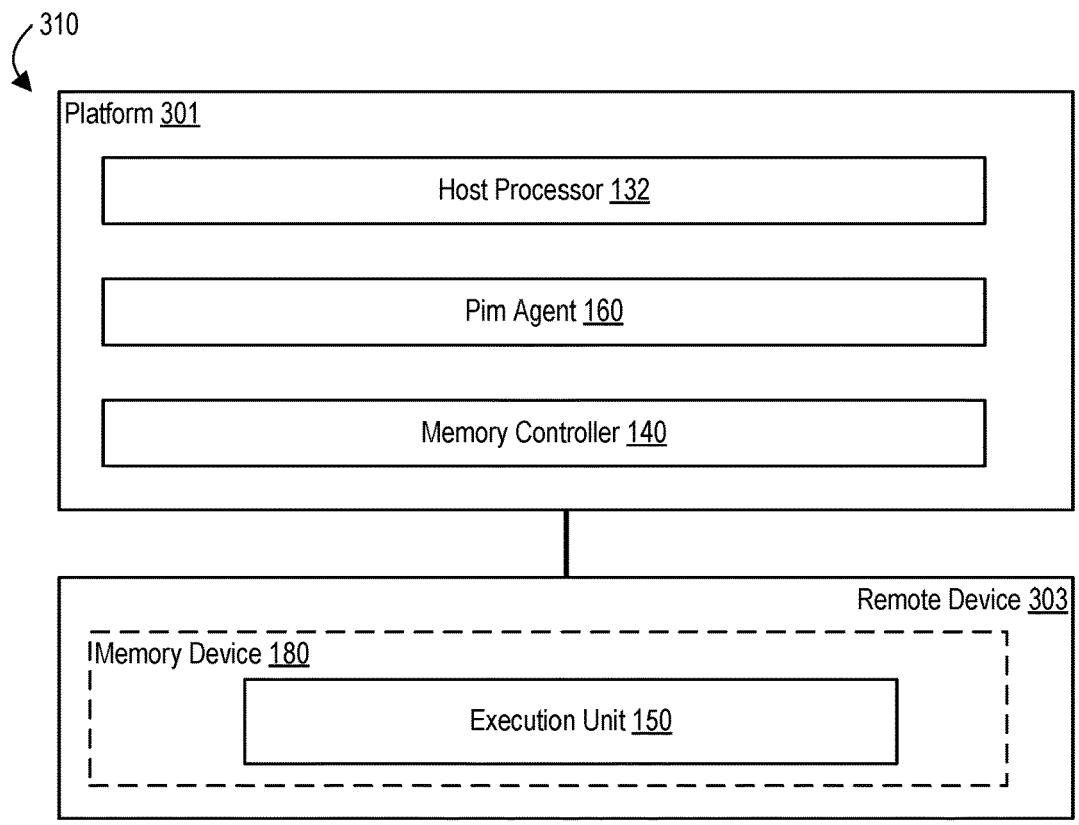
FIG. 3A sets forth a block diagram of an exemplary system configuration for supporting process isolation for a PIM device according to some implementations of the present disclosure.

For further explanation, FIG. 3A sets forth a block diagram of an exemplary system configuration 310 for supporting process isolation for a PIM device according to some implementations of the present disclosure. In the example configuration 310 of FIG. 3A, the memory controller 140, the PIM agent 160, and the host processor 132 and are implemented in the same System-on-Chip (SoC) platform 301. An execution unit 150 is implemented in a remote device 303. In some examples, the execution unit 150 is a component of a remote memory device 180 (e.g., a PIM-enabled memory device) that is implemented in the same package as the SoC platform 301.

Figure 3B:
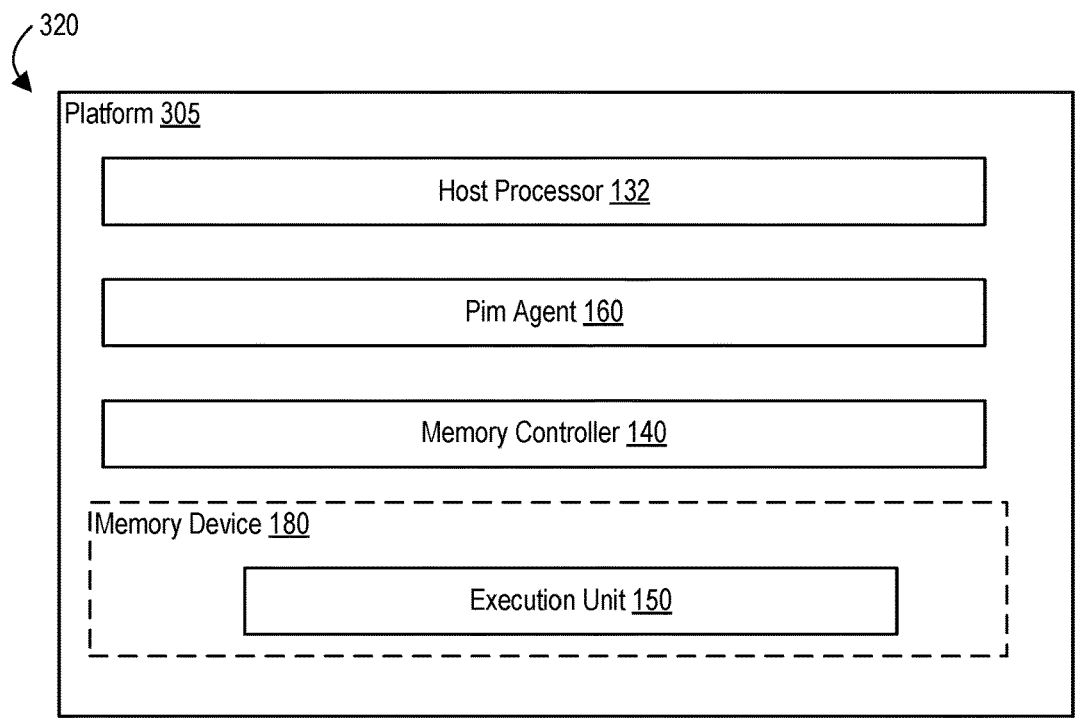
FIG. 3B sets forth another block diagram of an exemplary system configuration for supporting process isolation for a PIM device according to some implementations of the present disclosure.

For further explanation, FIG. 3B sets forth another block diagram of an exemplary system configuration 310 for supporting process isolation for a PIM device according to some implementations of the present disclosure. In the example configuration 320 of FIG. 3B, the execution unit 150, the memory controller 140, the PIM agent 160, and the host processor 132 are implemented on the same SoC platform 305. In some examples, the execution unit 150 is a PIM unit of memory device 180 (e.g., a PIM-enabled memory device) that is also implemented on the same SoC platform 305. Although the execution unit 150 is implemented on the same SoC platform 305 as the host processor 132, it is noted that the execution unit 150 is considered to be external to the host processor 132 in that logic circuitry that implements the execution unit 150 is external to logic circuitry that implements any processor core of the host processor 132.

Figure 4:
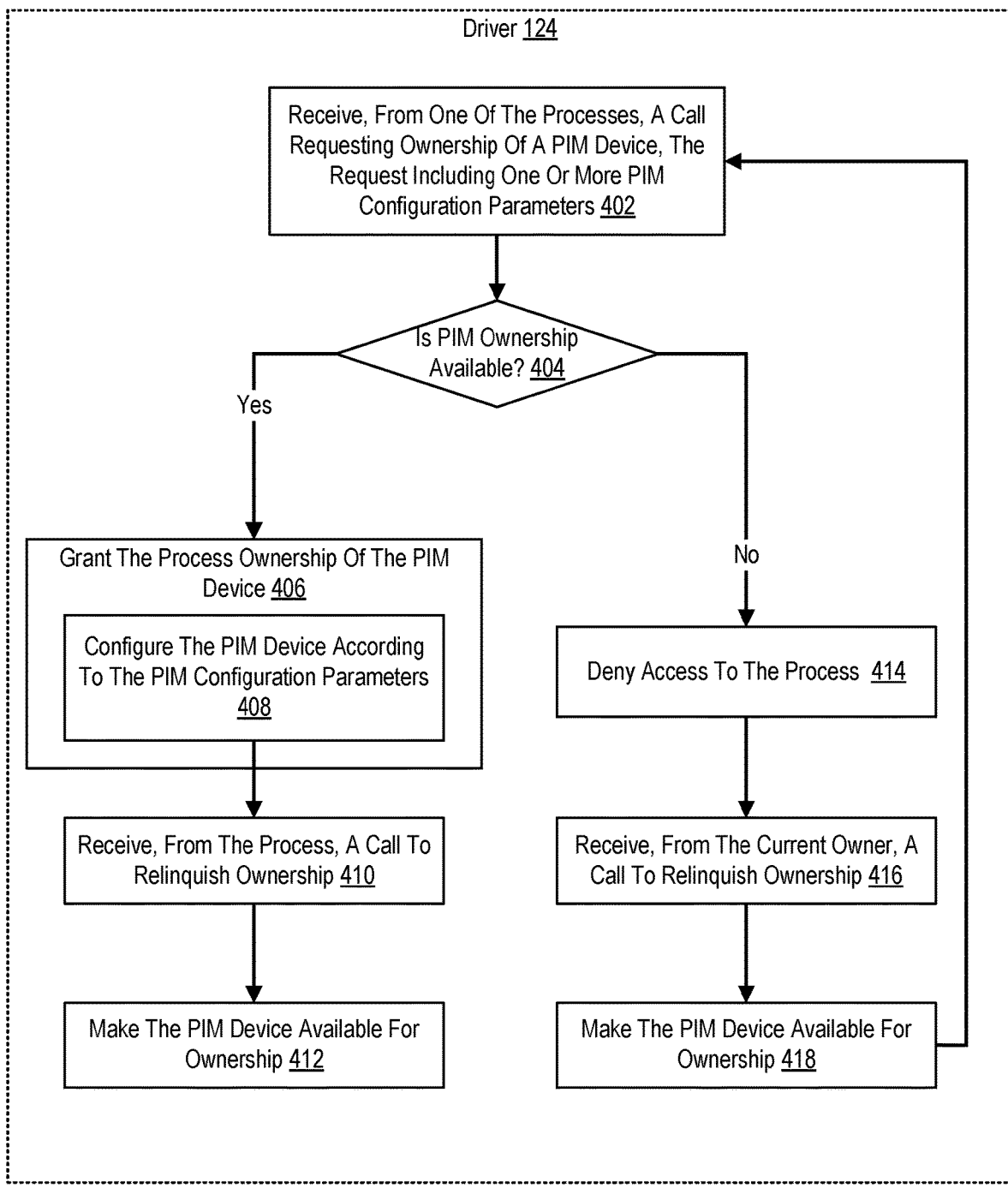
FIG. 4 sets forth a flow chart illustrating an aspects of an example method of process isolation for a PIM device according to implementations of the present disclosure.

FIG. 4 generally sets forth process isolation from the perspective of a driver 124 as described above. Readers will also recognize that, while a driver 124 is used here for explanation, an operating system, hypervisor, or PIM agent can also carry out the method of FIG. 4.

The method of FIG. 4 begins with the driver receiving 402, from a process, a call requesting ownership of a PIM device. The request includes one or more PIM configuration parameters. In the example of FIG. 4, the driver 124 receives a system call or IOCTL that includes the configuration parameters as well as the PID of the requesting PIM.

The method of FIG. 4 continues by determining 404 whether PIM ownership is available. Such a determination 404 is carried out by determining whether another PID (a PID not belonging to the requesting process) is currently stored in a record of PIM ownership maintained by the driver 124. If another PID is stored in the record, the driver 124 determines that PIM ownership is not available to requesting process and denies 414 access to the process. Denying 414 such access includes providing a return to the call from the process indicating that ownership is not available.

In the example of FIG. 4, the driver 124 will deny any requests from processes to become PIM owner until receiving 416 a call by the current owner to relinquish PIM ownership. Upon receiving 416 the call to relinquish PIM ownership the driver 124 makes 418 the PIM device again available for ownership. Making 418 the PIM device available for ownership is carried out by the PIM device clearing the record of PIM ownership of any PID. At this point, any process can request ownership of the PIM device.

In the method of FIG. 4, upon receiving 402 a request of ownership of a PIM device and determining 404 that PIM ownership is available, the driver 124 grants 406 the requesting process ownership of the PIM device. The driver 124 stores the PID of the now-owner process in the ownership record and configures 408 the PIM device according to the PIM configuration parameters received as parameters to the call requesting ownership. Such PIM configuration parameters can specify values for registers, locations of instructions in a LIS, and so on. The driver 124 provides a return to the calling process indicating success of the call. Such a return indicates that the PIM device has been configured and ownership is granted to the calling process.

FIG. 4 continues by receiving 410, by the driver 124, a call to relinquish ownership of the PIM device and making 412 the PIM device available for ownership. In this way, the driver 124 operates as an arbiter of ownership of the PIM device and ensures that only a single process is a PIM owner at any given time and only the driver can configure the PIM device. As such, the configuration space of the PIM device cannot be modified by a non-PIM owner.

Figure 5:
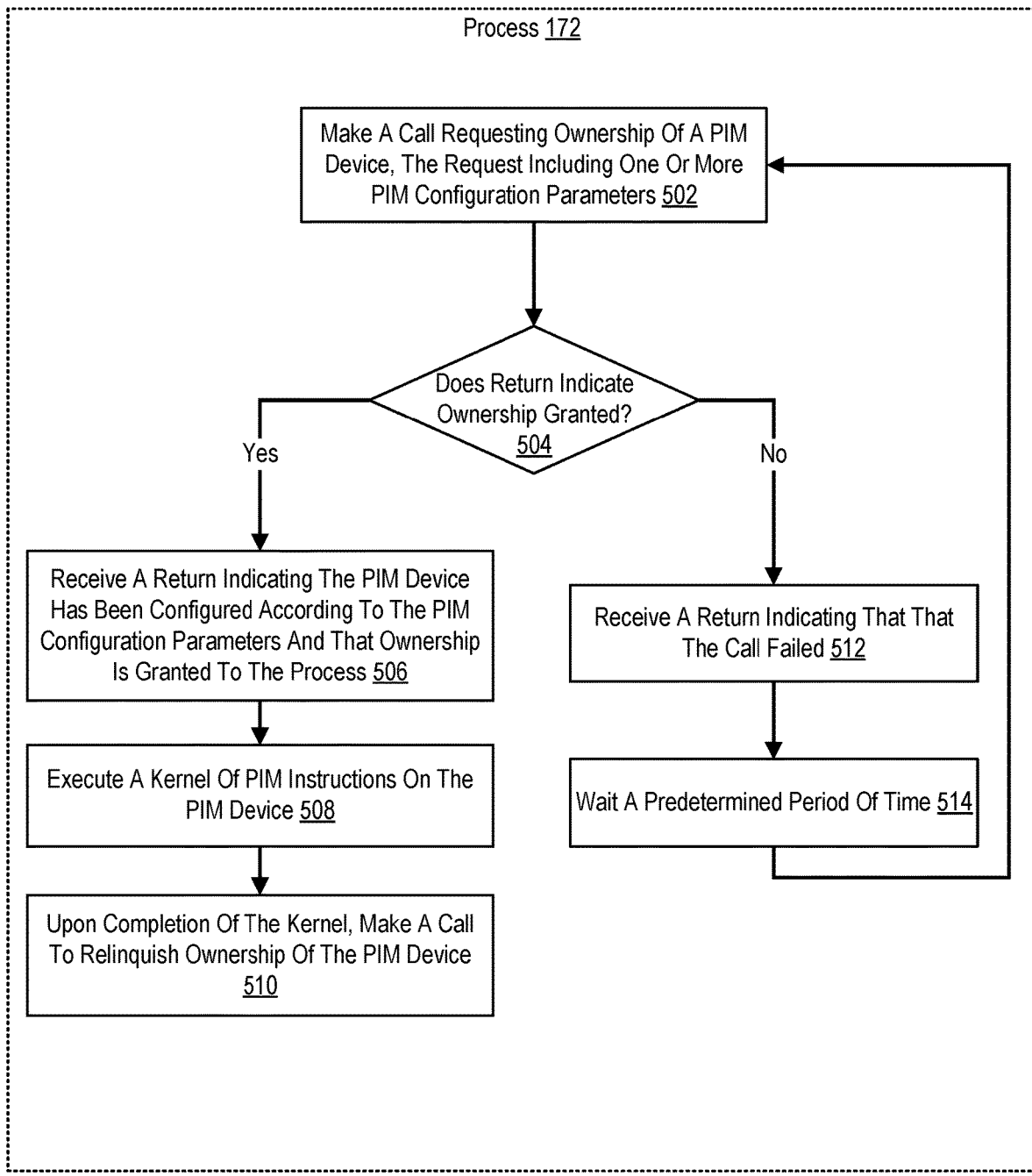
FIG. 5 sets forth a flow chart illustrating another aspects of the example method of process isolation for the PIM device according to implementations of the present disclosure.

FIG. 5 sets forth the process isolation from the perspective of a process. FIG. 5 begins with a process 172 in a multiprocessing system making 502 a call requesting ownership of a PIM device to driver 124. The request includes one or more PIM configuration parameters.

In the example of FIG. 5, the process 172 determines 504 whether a return (received from the driver) indicates that ownership has been granted. Upon receiving 512 a return indicating that the call failed (ownership was denied), the process 172 waits 514 for a predetermined period of time before again making 502 the call.

The calling process 172, in the example of FIG. 5, receives 506 the return indicating that the PIM device has been configured and that ownership is granted to the process 172. The process then executes 508 a kernel of PIM instruction on the device. Such execution is described below with respect to FIGS. 6 and 7. Upon completion of the kernel, the process 172 makes 510 a call to relinquish ownership of the PIM device.

Figure 6:
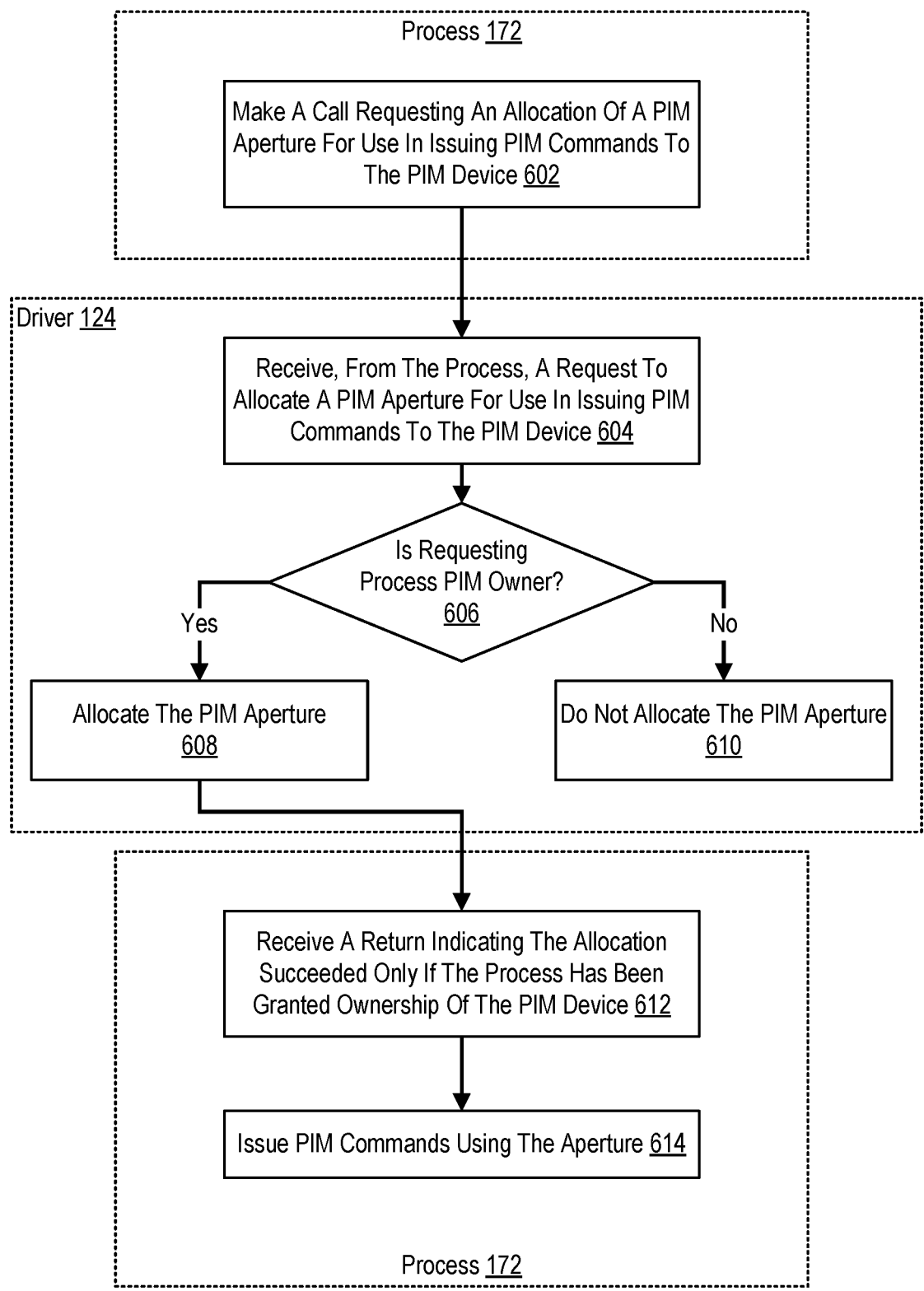
FIG. 6 sets forth a flow chart illustrating a method of PIM process isolation in a system that does not operate according to an extended ISA that explicitly supports PIM instructions according to implementations of the present disclosure.
Figure 7:
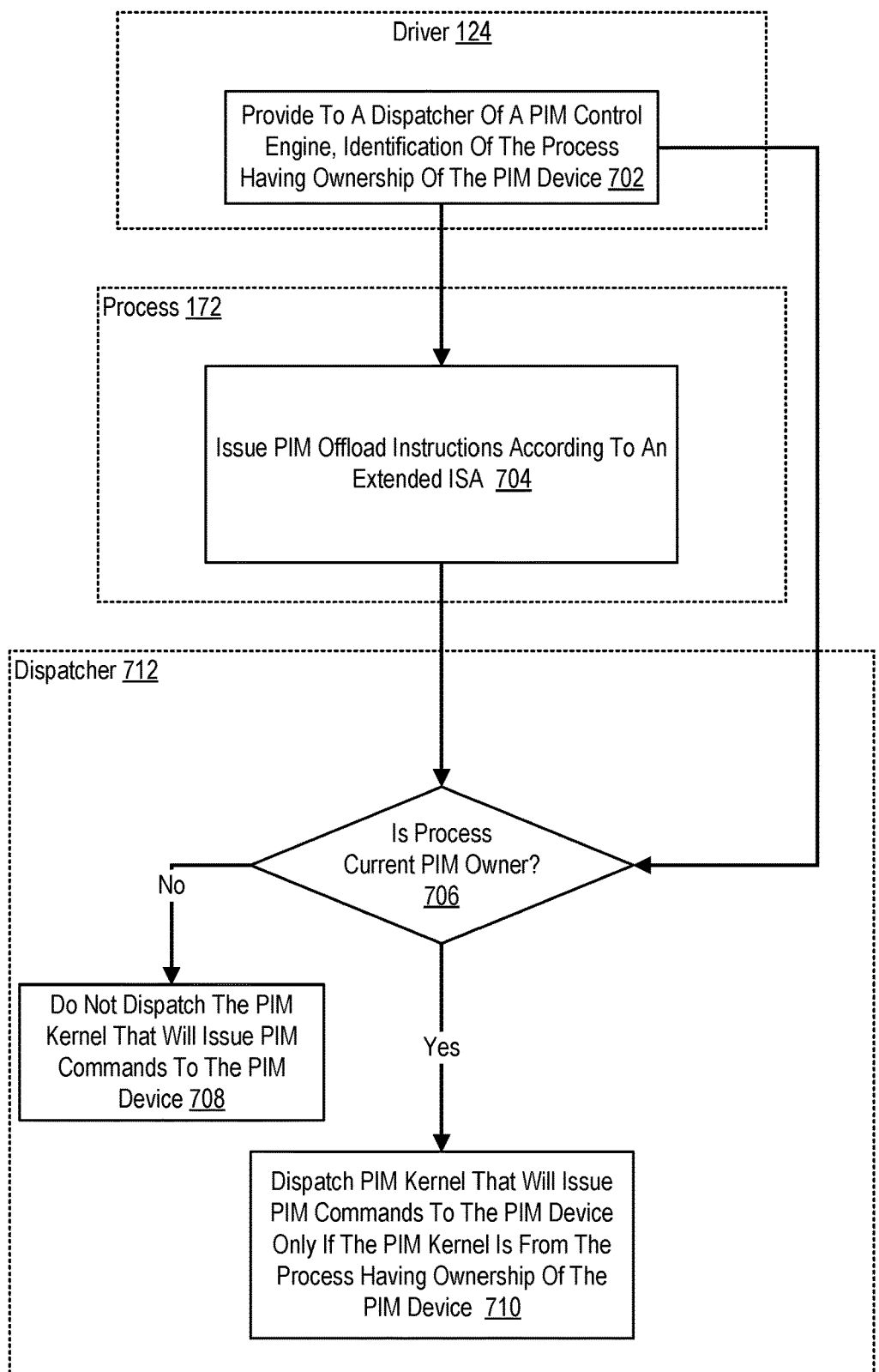
FIG. 7 sets forth a flow chart illustrating a method of PIM process isolation in a system that operates according to an extended ISA that explicitly supports PIM instructions according to implementations of the present disclosure.

For further explanation, FIGS. 6 and 7 set forth various aspects of isolating PIM process orchestration according to implementations of the present disclosure. FIG. 6 generally sets forth PIM process isolation in a system that does not operate according to an extended ISA that explicitly supports PIM instructions. To that end, the method of FIG. 6 includes making 602 a call requesting an allocation of a PIM aperture for use in issuing PIM instructions to the PIM device. Such a call includes a size of a memory range to be allocated. A well-behaved process 172 makes such a call to the driver 124 only after being granted (406 of FIG. 4)

ownership of the PIM device. Another process that is not the owner may make a similar call to allocate a PIM aperture. If the driver were to provide such an allocation, the non-owner process could cause PIM instructions to be executed on the PIM device using the allocated aperture. Allowing a non-PIM owner to execute PIM instructions instead of or in addition to the PIM owner can cause conflict and functional incorrectness.

To ensure functional correctness then, the driver 124 receives 604 the request to allocate the PIM aperture and determines 606 whether the requesting process is the current PIM owner. The driver 124 compares the requesting process's PID to the owner's PID as stored in the record described above. If the two do not match, then the requesting process is not the current owner. In such an example, the method of FIG. 6 continues by refusing allocation 610 of the PIM aperture. If, however, the PID of the requesting process matches the PID of the owner process, the driver 124 allocates the PIM aperture 608. The PIM aperture can be allocated through an OS system call to allocate a region of virtual memory. The driver 124 can then return the received memory range to the process.

The method of FIG. 6 continues by receiving 612 the return indicating the allocation succeeded along with the memory range of the PIM aperture. The process 172 then issues 614 PIM instructions using the aperture. Instructions targeting or otherwise utilizing the memory address within the PIM aperture are identified as PIM instructions rather than typical memory operations.

While FIG. 6 sets forth an example of PIM orchestration in a system that does not operate according to an extended ISA that explicitly supports PIM instructions (requiring the PIM aperture), FIG. 7 sets forth an example method of PIM orchestration in a system that does. The method of FIG. 7 includes providing 702 to a dispatcher 712 of a PIM control engine, an identification of the process having ownership of the PIM device. The dispatcher is tasked with dispatching instructions that are PIM-specific to a PIM device. However, without precautions, the dispatcher could dispatch PIM instructions from any process to the same PIM device. Such concurrent dispatching of PIM instructions from multiple different PIM processes to the same PIM device can result in functional incorrectness of data. To that end, the driver 124 provides the dispatcher 712 the PID of the current owner process of the PIM device. The driver 124 can program a register of the dispatcher 712 designated for that purpose with the PID of the current owner process.

The method of FIG. 7 continues by a process 172 issuing 704 PIM instructions according to the extended ISA and the dispatcher 712 determining 706 whether the process 172 is the current PIM owner. If the process 172 is not the current owner, the dispatcher does not dispatch 708 the PIM instructions to the PIM device. That is, if any process other than the current PIM owner as identified by the PIM owner's PID attempts to dispatch PIM instructions to the PIM device, the dispatcher will effectively block such instructions from executing. If the PID of the process 172 matches the PIM owner's PID, then the dispatcher 712 dispatch 710 the PIM instructions to the PIM device.

As mentioned above, the methods herein describe a driver carrying out various aspect of process isolation for PIM execution for explanation only, not limitation. In other implementations, an operating system, hypervisor, or PIM agent can carry out such process isolation.

Readers will recognize that process isolation for a PIM instruction execution in a multiprocessing environment provides various benefits. In some aspects, such process isolation eliminates functional incorrectness caused by multiples processes issuing instructions that cause data conflicts. In some aspects, the configuration space is secured from a vulnerability.

Implementations can be a system, an apparatus, a method, and/or logic. Computer readable program instructions in the present disclosure can be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. In some implementations, electronic circuitry including, for example, programmable logic circuitry, field-programmable gate arrays (FPGA), or programmable logic arrays (PLA) can execute the computer readable program instructions by utilizing state information of the computer readable program instructions.

Aspects of the present disclosure are described herein with reference to flowchart illustrations and/or block diagrams of methods, apparatus (systems), and logic circuitry according to some implementations of the disclosure. It will be understood that each block of the flowchart illustrations and/or block diagrams, and combinations of blocks in the flowchart illustrations and/or block diagrams, can be implemented by logic circuitry.

The logic circuitry can be implemented in a processor, other programmable data processing apparatus, or other device to cause a series of operational steps to be performed on the processor, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and logic circuitry according to various implementations of the present disclosure. In this regard, each block in the flowchart or block diagrams can represent a module, segment, or portion of instructions, which includes one or more executable instructions for implementing the specified logical function(s). In some alternative implementations, the functions noted in the block can occur out of the order noted in the figures. For example, two blocks shown in succession can, in fact, be executed substantially concurrently, or the blocks can sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts or carry out combinations of special purpose hardware and computer instructions.

While the present disclosure has been particularly shown and described with reference to implementations thereof, it will be understood that various changes in form and details can be made therein without departing from the spirit and scope of the following claims. Therefore, the implementations described herein should be considered in a descriptive sense only and not for purposes of limitation. The present disclosure is defined not by the detailed description but by the appended claims, and all differences within the scope will be construed as being included in the present disclosure.

What is claimed is:

1. A system comprising:
a processor;
memory operatively coupled to the processor; and
a processing-in-memory (PIM) device, wherein the processor comprises one or more processing cores executing a plurality of processes and the memory comprises computer program instructions that are executable by the processor to:
receive, from a process of the plurality of processes, a call requesting ownership of the PIM device, the call including one or more PIM configuration parameters and a process identifier (PID) of the process requesting the ownership; and
grant the ownership of the PIM device to the process requesting the ownership, including configuring the PIM device according to the one or more PIM configuration parameters and recording the PID of the process requesting the ownership.

2. The system of claim 1, further comprising computer program instructions that are executable by the processor to:
receive, from the process requesting the ownership, a call to relinquish the ownership; and
make the PIM device available for the ownership.

3. The system of claim 1, further comprising computer program instructions that are executable by the processor to:
deny access to the process requesting the ownership responsive to determining that the ownership is not available.

4. The system of claim 3, further comprising computer program instructions that are executable by the processor to:
make the PIM device available for the ownership responsive to a request to relinquish the ownership;
again receive, from the process requesting the ownership, a call requesting the ownership of the PIM device, the call including the one or more PIM configuration parameters; and
grant the ownership of the PIM device again to the process requesting the ownership.

5. The system of claim 3, further comprising computer program instructions that are executable by the processor to:
receive, from the process requesting the ownership, a request to allocate a PIM aperture for use in issuing PIM instructions to the PIM device; and
allocate the PIM aperture responsive to determining that the process requesting the ownership has been granted the ownership of the PIM device.

6. The system of claim 3, further comprising computer program instructions that are executable by the processor to:
provide to a dispatcher of a PIM control engine, identification of the process having the ownership of the PIM device, wherein the dispatcher is configured to dispatch PIM instructions to the PIM device responsive to determining that the PIM instructions are from the process having the ownership of the PIM device.

7. A method comprising:
receiving, from a process, a call requesting ownership of a processing-in-memory (PIM) device, the call including one or more PIM configuration parameters and a process identifier (PID) of the process requesting the ownership; and
granting the process the ownership of the PIM device responsive to determining that the ownership is available, including configuring the PIM device according to the one or more PIM configuration parameters and recording the PID of the process requesting the ownership.

8. The method of claim 7, further comprising:
receiving, from the process requesting the ownership, a call to relinquish the ownership; and
making the PIM device available for the ownership.

9. The method of claim 7, further comprising:
denying access to the process requesting the ownership responsive to determining that the ownership is not available.

10. The method of claim 9, further comprising:
making the PIM device available for the ownership responsive to a request to relinquish the ownership;
again receiving, from the process requesting the ownership, a call requesting the ownership of the PIM device, the request including the one or more PIM configuration parameters; and
granting the ownership of the PIM device again to the process requesting the ownership.

11. The method of claim 9, further comprising:
receiving, from the process requesting the ownership, a request to allocate a PIM aperture for use in issuing PIM instructions to the PIM device; and
allocating the PIM aperture responsive to determining that the process requesting the ownership has been granted the ownership of the PIM device.

12. The method of claim 7, further comprising:
providing to a dispatcher of a PIM control engine, identification of the process having the ownership of the PIM device, wherein the dispatcher is configured to dispatch PIM instructions to the PIM device responsive to determining that the PIM instructions are from the process having the ownership of the PIM device.

13. The method of claim 7, wherein the method is carried out by one of: a driver, a hypervisor, an operating system, and a PIM agent.

14. An apparatus comprising:
a processing-in-memory (PIM) device; and
one or more processing cores executing a plurality of processes, wherein the one or more processing cores execute at least one of the plurality of processes to:
make a call requesting ownership of the PIM device, the call including one or more PIM configuration parameters and a process identifier (PID) of the process; and
receive a return indicating that the PIM device has been configured according to the one or more PIM configuration parameters and that the ownership has been granted to the process.

15. The apparatus of claim 14, wherein the one or more processing cores further execute the at least one of the plurality of processes to:
execute a kernel of PIM instructions on the PIM device; and
upon completion of the kernel, make a call to relinquish the ownership of the PIM device.

16. The apparatus of claim 14, wherein the one or more processing cores further execute a second process of the plurality of processes to:
make a call requesting the ownership of the PIM device, the call including one or more PIM configuration parameters; and
receive a return indicating that that the call failed.

17. The apparatus of claim 16, wherein the one or more processing cores further execute the second process:

retry the call requesting the ownership of the PIM device a predetermined period of time after receiving the return indicating that the call failed; and receive a return indicating that the PIM device has been configured and that the ownership has been granted to the second process.

18. The apparatus of claim 14, wherein the one or more processing cores further execute the at least one of the plurality of processes to:

make a call requesting an allocation of a PIM aperture for use in issuing PIM instructions to the PIM device;

receive a return indicating that the allocation succeeded responsive to determining that the process has been granted the ownership of the PIM device; and issue PIM instructions using the PIM aperture.

19. The apparatus of claim 14, wherein the one or more processing cores further execute the at least one of the plurality of processes to:

issue PIM instructions according to an extended Instruction Set Architecture (ISA), wherein the PIM instructions are dispatched for execution responsive to the process having the ownership of the PIM device.

20. The apparatus of claim 14, wherein the PID of the process is provided to a PIM agent.

* * * * *